No. 723,373. PATENTED MAR. 24, 1903.
O. C. DURYEA & M. C. WHITE.
NUT.
APPLICATION FILED MAY 23, 1902.
NO MODEL.
Fig. I.
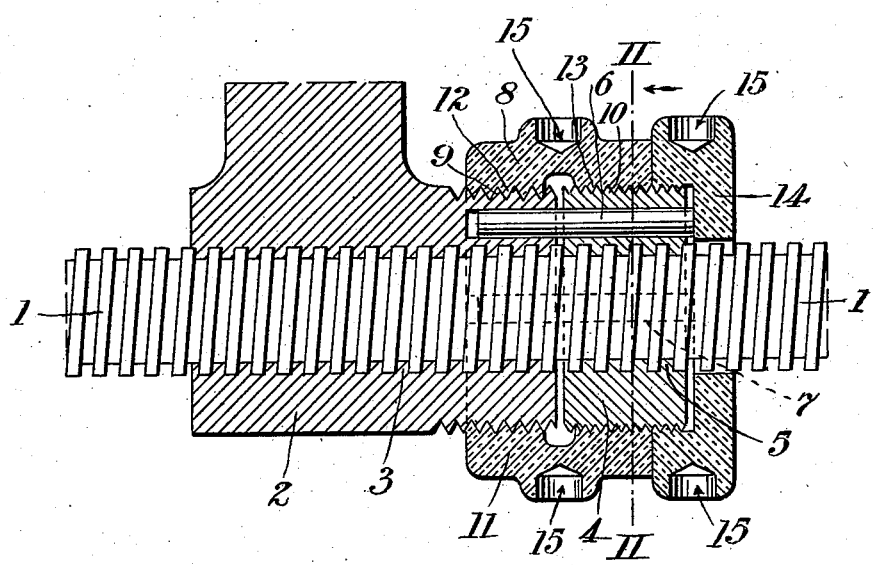
Fig. II.
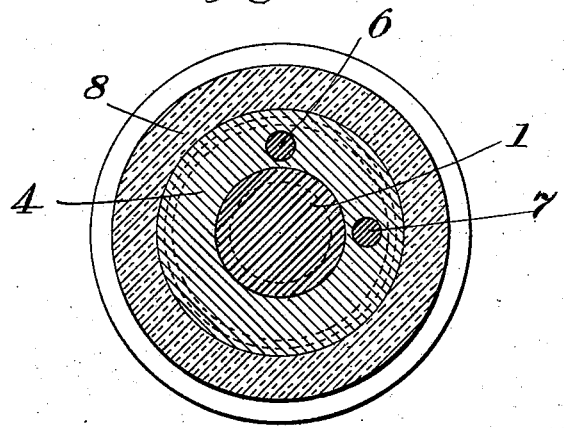
Witnesses:
G. T. Hackley.
Edmund A. Strauss.
Inventors:
Otho C. Duryea
Morris C. White.
by Townsend Bros
their Attys.

UNITED STATES PATENT OFFICE.

OTHO C. DURYEA AND MORRIS C. WHITE, OF LOS ANGELES, CALIFORNIA, ASSIGNORS TO NATIONAL FREE PISTON ENGINE COMPANY, (LIMITED,) OF LOS ANGELES, CALIFORNIA, A CORPORATION OF CALIFORNIA.

NUT.

SPECIFICATION forming part of Letters Patent No. 723,373, dated March 24, 1903.

Application filed May 23, 1902. Serial No. 108,727. (No model.)

*To all whom it may concern:*

Be it known that we, OTHO C. DURYEA and MORRIS C. WHITE, citizens of the United States, residing at Los Angeles, in the county of Los Angeles and State of California, have invented a new and useful Nut, of which the following is a specification.

Our invention relates to a nut that may be adjusted to give any desired grip on the screw; and one object of our invention is to provide for a very fine adjustment without the use of fine threads or delicate parts.

Another object of our invention is to provide a nut which will be able to withstand severe strains and one which will be capable of sustaining hard service and long and continous wear.

Other objects—such as simplicity, compactness, and ease of adjustment—are attained, which will be brought out in the following description.

Referring to the drawings, Figure I is a longitudinal section through the nut. Fig. II is a section taken on the line II II of Fig. I.

1 designates a screw.

2 is one part of the nut provided with internal threads 3. 4 is another part provided with internal threads 5. The threads 3 and 5 may be of the same pitch and adapted to engage the screw 1.

6 and 7 are pins which project into chambers in each part 2 and 4. The pins prevent the parts 2 and 4 from turning relatively to each other. One pin is positioned in one diametrical plane of the parts 2 and 4, and the other pin is positioned in another diametrical plane of the parts, so that when assembling the parts of the nut the threads of each part will be placed in proper relations. The part 2 has external threads 9. The part 4 has external threads 10, which may be of different pitch from the threads 9.

11 is a sleeve provided with one set of threads 12, which engage the threads 9, and is also provided with another set of threads 13, which engage the threads 10.

14 is a lock-nut which may engage the threads 10 and prevent the sleeve 11 from turning.

The sleeve 8 and lock-nut 14 may be provided with holes 15, adapted to receive a spanner.

The parts may be assembled in the positions shown in the drawings, and by loosening the lock-nut 14 the sleeve 8 may be turned, which will either draw the parts 2 and 4 together or force them apart, depending on the direction of rotation of the sleeve.

Assuming that the threads 9, 12, 10, and 13 are right-hand threads, when the sleeve 11 is given one revolution it is moved along the member 2 the thickness of one thread 9 and draws the part 4 toward the part 2 a distance equal to the difference between the thickness of the threads 9 and 10. Thus by making the threads 9 and 12 of one pitch and the threads 10 and 13 of a pitch slightly different the parts may be adjusted to a nicety and any degree of pressure of the internal threads of each part against the threads of the screw 1 may be secured. For example, by constructing the two pitches with a difference of one one-thousandth one revolution of the sleeve will increase or decrease the distance between the two parts one one-thousandth of an inch, according to the direction of rotation of the sleeve. Thus the size of the threads may be as large as desired to secure the requisite strength.

The pins 6 and 7 may be readily withdrawn by removing the lock-nut 14, which acts to hold them in place.

It is immaterial whether the screw 1 turns and the nut is stationary, or vice versa. In the drawings we have shown a stationary nut.

It is obvious that various changes may be made in the herein-described embodiment of our invention without evading the scope of the claims.

The nut may be used as a lock-nut, if desired, by providing the part 2 with means to be engaged by a wrench. For instance, a hexagonal head may be formed thereon. The lock-nut 14 may be dispensed with. Thus when it is desired to lock the nut from turning on the screw the sleeve 11 may be turned a sufficient degree to draw the parts 2 and 4 together and cause the internal threads of the parts to tightly grip the threads of the screw. By making the difference of pitches very slight, as hereinbefore described, any desired pressure of the internal threads against the screw may be easily produced, which will effectually hold the nut from turning on the screw.

What we claim, and desire to secure by Letters Patent of the United States, is—

1. A nut having two parts provided with dissimilar threads, means to prevent said parts from turning relatively to each other, and a sleeve having dissimilar threads which engage the first-named threads.

2. A nut having two internally-threaded parts, one part having an external thread of one pitch, the other part having an external thread of a greater pitch, and a sleeve having threads which engage said external threads.

3. A nut having two parts, one of said parts having threads, means to prevent said parts from turning relatively to each other, a sleeve engaging both of said parts, said sleeve having threads which engage with the threads of said part.

4. A nut with two parts having similar sets of threads and dissimilar sets of threads, means to prevent said parts from turning relatively to each other, and a third part having dissimilar sets of threads which engage said first-named dissimilar sets of threads.

5. A nut having two internally-threaded parts, one part having an external thread of one pitch, the other part having an external thread of another pitch, a sleeve having dissimilar threads which engage said external threads, and means to hold said two parts from rotating relatively to each other.

6. A nut having two internally-threaded parts, one part having an external thread of one pitch, the other part having an external thread of another pitch, a sleeve having threads which engage said external threads, and a pin slidably mounted in one of said parts and engaging the other part.

7. A nut having two internally-threaded parts, one part having external threads of one pitch, the other part having external threads of another pitch, a sleeve having threads which engage said external threads, and a removable pin engaging both of said parts.

8. A nut having two internally-threaded parts, one part having an external thread, a sleeve having internal threads which engage said external threads, said sleeve also engaging said other part, and means to hold said sleeve from rotation relatively to said parts.

9. A nut having two internally-threaded parts, one part having an external thread, a sleeve having internal threads which engage said external threads, said sleeve also engaging said other part, and detachable means to hold said sleeve from rotation relatively to said parts.

10. A nut having two internally-threaded parts, one part having an external thread, a sleeve having internal threads which engage said external threads, said sleeve also engaging said other part, and a lock-nut engaging the external threads of one of said parts and movable into engagement with said sleeve.

11. A nut having two internally-threaded parts, one part having an external thread, a sleeve having internal threads, said sleeve also engaging said other part, a plurality of pins mounted in one of said parts and engaging the other part, said pins being positioned at different diametrical planes of each part.

12. A nut having a plurality of parts, said parts having screw-threads of equal pitch, means to hold said parts from rotating relatively to each other, and means to move one of said parts in one direction at one speed and to move another part in the same direction at another speed.

13. A nut having two internally-threaded parts, one part having an external thread of one pitch, the other part having an external thread of a greater pitch, a sleeve having two sets of threads one set having a greater pitch than the other set, one of said sets of threads engaging the external threads of one of said parts, the other of said sets of threads engaging the external threads of the other of said parts.

In witness whereof we have signed our names to this specification, in the presence of two subscribing witnesses, at Los Angeles, California, this 17th day of May, 1902.

OTHO C. DURYEA.
MORRIS C. WHITE.

Witnesses:
G. T. HACKLEY,
F. M. TOWNSEND.